(12) United States Patent
Fruchter et al.

(10) Patent No.: US 12,093,101 B2
(45) Date of Patent: Sep. 17, 2024

(54) SYSTEMS AND METHODS FOR PEAK POWER CONTROL

(71) Applicant: Meta Platforms Technologies, LLC, Menlo Park, CA (US)

(72) Inventors: Vlad Fruchter, Los Altos, CA (US); Nishant Sitapara, Denver, CO (US); Javid Jaffari, San Diego, CA (US); Shrirang Madhav Yardi, San Jose, CA (US); Bardia Zandian, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/682,917

(22) Filed: Feb. 28, 2022

(65) Prior Publication Data
US 2023/0168729 A1 Jun. 1, 2023

Related U.S. Application Data

(60) Provisional application No. 63/284,286, filed on Nov. 30, 2021.

(51) Int. Cl.
*G06F 1/28* (2006.01)
*G02B 27/01* (2006.01)
*G05F 1/66* (2006.01)

(52) U.S. Cl.
CPC ............ *G06F 1/28* (2013.01); *G02B 27/017* (2013.01); *G05F 1/66* (2013.01)

(58) Field of Classification Search
CPC ............ G06F 1/28; G02B 27/017; G05F 1/66
See application file for complete search history.

(56) References Cited

U.S. PATENT DOCUMENTS

| | | | |
|---|---|---|---|
| 7,562,234 B2* | 7/2009 | Conroy | G06F 1/3287 713/340 |
| 8,046,600 B2* | 10/2011 | Holle | G06F 1/189 713/340 |
| 8,769,316 B2* | 7/2014 | Ananthakrishnan | G06F 1/26 700/286 |

(Continued)

FOREIGN PATENT DOCUMENTS

WO 2019117962 A1 6/2019

OTHER PUBLICATIONS

International Search Report and Written Opinion for International Application No. PCT/US2022/051240, mailed Mar. 30, 2023, 11 pages.

*Primary Examiner* — Aurel Prifti
(74) *Attorney, Agent, or Firm* — Foley & Lardner LLP

(57) ABSTRACT

Systems and methods for peak power control include control circuitry which identifies a condition for a device. The control circuitry can apply the condition for the device to one or more models maintained for a plurality of device processing units of the device to determine one or more performance characteristics for the plurality of processing units. The control circuitry can distribute power credits to the plurality of device processing units of the device according to the determined performance characteristics for the plurality of device processing units, to manage a respective peak power for each respective device processing unit according to a number of the power credits distributed to the respective device processing unit.

20 Claims, 13 Drawing Sheets

(56) References Cited

U.S. PATENT DOCUMENTS

| | | | | |
|---|---|---|---|---|
| 8,788,866 | B2* | 7/2014 | Anderson | G06F 11/3058 713/340 |
| 9,477,279 | B1* | 10/2016 | Piszczek | G06F 1/206 |
| 9,568,978 | B2* | 2/2017 | Burns | G06F 1/3243 |
| 10,268,262 | B2* | 4/2019 | Khatri | G06F 1/3234 |
| 11,181,960 | B2* | 11/2021 | Yam | H04L 12/10 |
| 2012/0023345 | A1* | 1/2012 | Naffziger | G06F 1/324 713/340 |
| 2013/0151869 | A1* | 6/2013 | Steinman | G06F 1/3243 713/300 |
| 2013/0275781 | A1* | 10/2013 | Ramage | G06F 1/3275 713/300 |
| 2014/0067139 | A1* | 3/2014 | Berke | G06F 1/26 700/291 |
| 2014/0143558 | A1* | 5/2014 | Kuesel | G06F 1/26 713/300 |
| 2015/0067356 | A1 | 3/2015 | Trichy Ravi et al. | |
| 2015/0331433 | A1* | 11/2015 | Naffziger | G06F 1/324 700/300 |
| 2015/0346798 | A1* | 12/2015 | Dongara | G06F 1/206 713/320 |
| 2015/0370303 | A1* | 12/2015 | Krishnaswamy | G06F 1/3243 713/322 |
| 2016/0179110 | A1* | 6/2016 | Rotem | G05F 1/10 327/538 |
| 2017/0255247 | A1* | 9/2017 | Ardanaz | G06F 1/3287 |
| 2019/0041937 | A1* | 2/2019 | Li | G06F 1/28 |
| 2020/0319690 | A1* | 10/2020 | Sodhi | G06F 1/28 |
| 2020/0341533 | A1* | 10/2020 | Ho | G06F 1/3296 |
| 2021/0216377 | A1* | 7/2021 | Arlagadda Narasimharaju | G06F 1/3287 |
| 2022/0091649 | A1* | 3/2022 | Knoth | G06F 1/28 |
| 2022/0137692 | A1* | 5/2022 | DiBene, II | G06F 1/3203 713/320 |
| 2022/0413584 | A1* | 12/2022 | Born | G06F 1/3228 |
| 2023/0205304 | A1* | 6/2023 | Man | G06F 1/3206 713/320 |
| 2023/0350584 | A1* | 11/2023 | Desai | G06F 3/0659 |

\* cited by examiner

SYSTEMS AND METHODS FOR PEAK POWER CONTROL

CROSS-REFERENCE TO RELATED APPLICATIONS

This application claims the benefit of and priority to U.S. Application No. 63/284,286, filed Nov. 30, 2021, the contents of which are incorporated by reference in their entirety.

FIELD OF DISCLOSURE

The present disclosure is generally related to power management, including but not limited to managing peak power for devices.

BACKGROUND

Devices, such as battery operated or wireless devices, typically include some power management system. The power management systems are typically overdesigned to run on a maximum amount of power consumed simultaneously by processing units of the device. However, overdesigning such devices to operate on a worst-case scenario often results in increased design and manufacturing costs to support the power management system.

SUMMARY

In one aspect, this disclosure is directed to a method. The method includes identifying, by one or more control circuitries of a device, a condition for the device. The method can include applying, by the one or more control circuitries, the condition for the device to one or more models maintained for a plurality of device processing units of the device to determine one or more performance characteristics for the plurality of processing units. The method can include distributing, by the one or more control circuitries, power credits to the plurality of device processing units of the device according to the determined performance characteristics for the plurality of device processing units, to manage a respective peak power for each respective device processing unit according to a number of the power credits distributed to the respective device processing unit.

In some embodiments, the method includes receiving, by the one or more control circuitries, a request for additional power credits from a processing unit of the plurality of device processing units. The method may include determining, by the one or more control circuitries, an available number of power credits for the device. The method may include allocating, by the one or more control circuitries, at least one additional power credit for the device processing unit according to the available number of power credits.

In some embodiments, the method includes receiving, by the one or more control circuitries, a request for additional power credits from a first device processing unit of the plurality of device processing units. The method may include determining, by the one or more control circuitries, according to the one or more models, a quality of service (QoS) level for the first device processing unit and a QoS level for a second device processing unit. The method may include recalling, by the one or more control circuitries, at least one power credit from the second device processing unit of the plurality of device processing units. The method may include allocating, by the one or more control circuitries, the at least one power credit to the first device processing unit. In some embodiments, the second device processing unit degrades at least one of the one or more performance characteristics for the second device processing unit responsive to the recalling of the at least one power credit. In some embodiments, the second device processing unit at least one of degrades a calculation rate, degrades a calculation accuracy, avoids performing at least one processing step, reduces an operating voltage, or reduces an operating frequency.

In some embodiments, the one or more control circuitries manage the respective peak power by managing a data throughput according to the number of the power credits distributed to the respective device processing unit. In some embodiments, the one or more control circuitries manage the respective peak power by delaying execution of one or more processes according to the number of the power credits distributed to the respective device processing unit. In some embodiments, the one or more performance characteristics comprise at least one of a predicted peak power consumption, a predicted execution completion deadline, or a predicted slack time. In some embodiments, the method includes receiving, by the one or more control circuitries, from a first device processing unit of the plurality of device processing units, a request to recall a power credit allocated to the first device processing unit. The method may further include recalling, by the one or more control circuitries, the power credit from the first device processing unit. In some embodiments, the method includes allocating, by the one or more control circuitries, the power credit recalled from the first device processing unit to a second device processing unit.

In another aspect, this disclosure is directed to a device. The device can include a plurality of device processing units. The device can include one or more control circuitries configured to identify a condition for the device. The one or more control circuitries may be configured to apply the condition for the device to one or more models maintained for the plurality of device processing units to determine one or more performance characteristics for the plurality of device processing units. The one or more control circuitries may be configured to distribute power credits to the plurality of device processing units according to the determined performance characteristics for the plurality of device processing units, to manage a respective peak power for each respective device processing unit according to a number of the power credits distributed to the respective device processing unit.

In some embodiments, the one or more control circuitries are configured to receive a request for additional power credits from a device processing unit of the plurality of device processing units. The one or more control circuitries may be further configured to determine an available number of power credits for the device. The one or more control circuitries may be further configured to allocate at least one additional power credit for the device processing unit according to the available number of power credits.

In some embodiments, the one or more control circuitries are configured to receive a request for additional power credits from a first device processing unit of the plurality of device processing units. The one or more control circuitries may be further configured to determine, according to the one or more models, a quality of service (QoS) level for the first device processing unit and a QoS level for a second device processing unit. The one or more control circuitries may be further configured to recall at least one power credit from the second device processing unit of the plurality of device processing units. The one or more control circuitries may be further configured to allocate the at least one power credit to the device first processing unit. In some embodiments, the second device processing unit degrades at least one of the one or more performance characteristics for the second device processing unit responsive to the recalling of the at least one power credit. In some embodiments, the second device processing unit at least one of degrades a calculation rate, degrades a calculation accuracy, avoids performing at least one processing step, reduces an operating voltage, or reduces an operating frequency.

In some embodiments, the one or more control circuitries manage the respective peak power by managing a data throughput according to the number of the power credits distributed to the respective device processing unit. In some embodiments, the one or more control circuitries manage the respective peak power by delaying an execution of one or more processes according to the number of the power credits distributed to the respective device processing unit. In some embodiments, the one or more performance characteristics comprise at least one of a predicted peak power consumption, a predicted execution completion deadline, or a predicted slack time. In some embodiments, the one or more control circuitries are configured to receiving, by the one or more control circuitries, from a first device processing unit of the plurality of device processing units, a request to recall a power credit allocated to the first device processing unit. The one or more control circuitries may be further configured to recalling, by the one or more control circuitries, the power credit from the first device processing unit. The one or more control circuitries may be further configured to allocating, by the one or more control circuitries, the power credit recalled from the first device processing unit to a second device processing unit.

In another aspect, this disclosure is directed to a non-transitory computer readable medium storing instructions that, when executed by one or more control circuitries, cause the one or more control circuitries to identify a condition for a device. The instructions can further cause the one or more control circuitries to apply the condition for the device to one or more models maintained for a plurality of device processing units of the device to determine one or more performance characteristics for the plurality of device processing units. The instructions may further cause the one or more control circuitries to distribute power credits to the plurality of device processing units according to the determined performance characteristics for the plurality of device processing units, to manage a respective peak power for the respective device processing unit according to a number of the power credits distributed to the respective device processing unit.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section A discloses an artificial reality system which may be useful for practicing embodiments described herein;

Section B discloses a computing system which may be usable to implement aspects of the present disclosure; and Section C discloses systems and methods for peak power control.

A. Artificial Reality System

Figure 1:
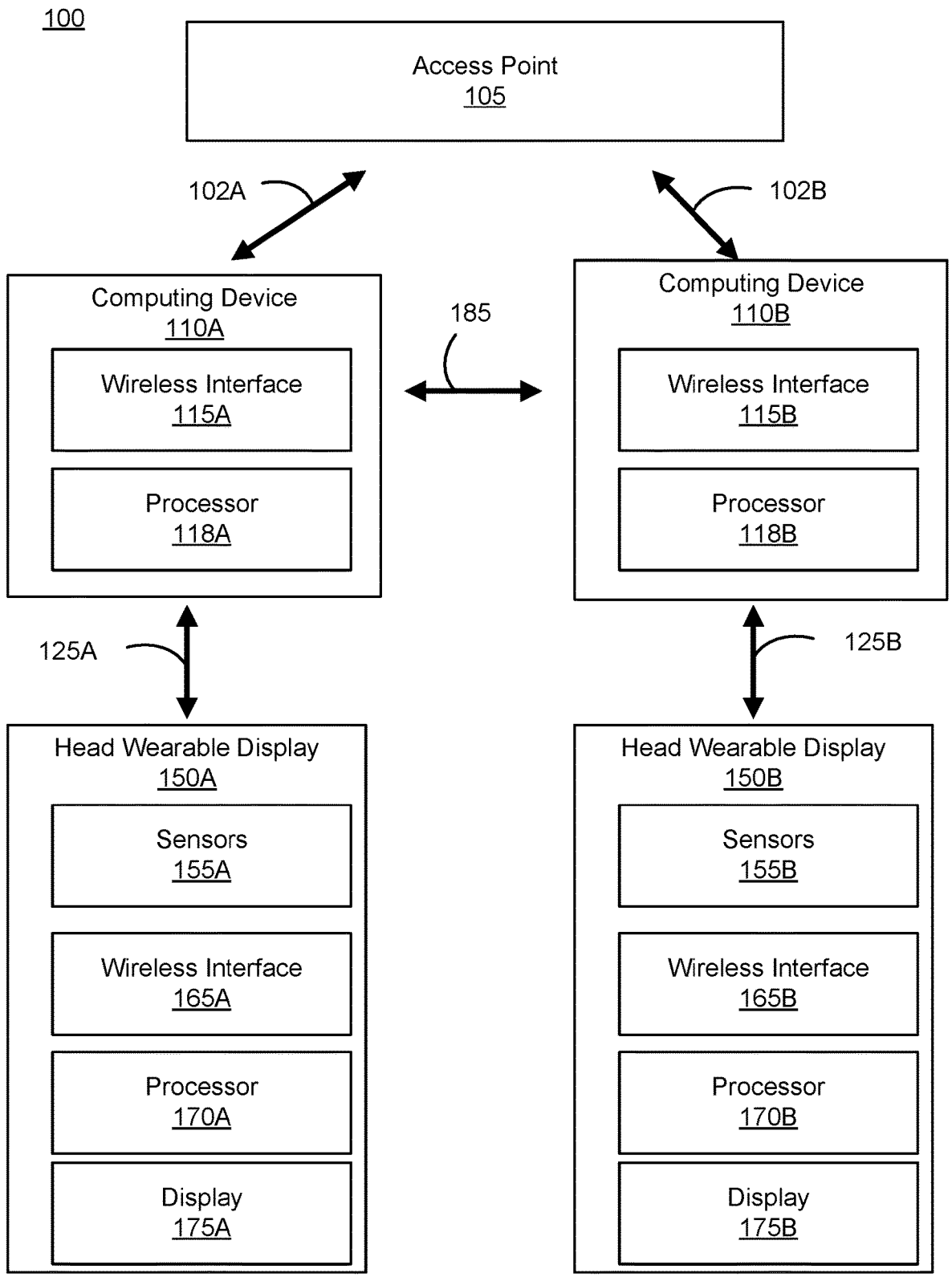
FIG. 1 is a diagram of a system environment including an artificial reality system, according to an example implementation of the present disclosure.

Disclosed herein are systems and methods for facilitating distribution of artificial reality (e.g., augmented reality (AR), virtual reality (VR), or mixed reality (MR)) content. FIG. 1 is a block diagram of an example artificial reality system environment 100. In some embodiments, the artificial reality system environment 100 includes a head wearable display (HWD) 150 worn by a user, and a console 110 providing content of artificial reality to the HWD 150. The HWD 150 may detect its location and/or orientation of the HWD 150, and provide the detected location/or orientation of the HWD 150 to the console 110. The console 110 may generate image data indicating an image of the artificial reality according to the detected location and/or orientation of the HWD 150 as well as a user input for the artificial reality, and transmit the image data to the HWD 150 for presentation.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming, for an example, that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming, for another example, that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110, or a combination of them, may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation, and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming, for an example, that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location, and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location, and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space, and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location, and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location, and an orientation of the HWD 150 in a physical space into a virtual space (or simultaneous localization and mapping (SLAM) data), motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 is a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
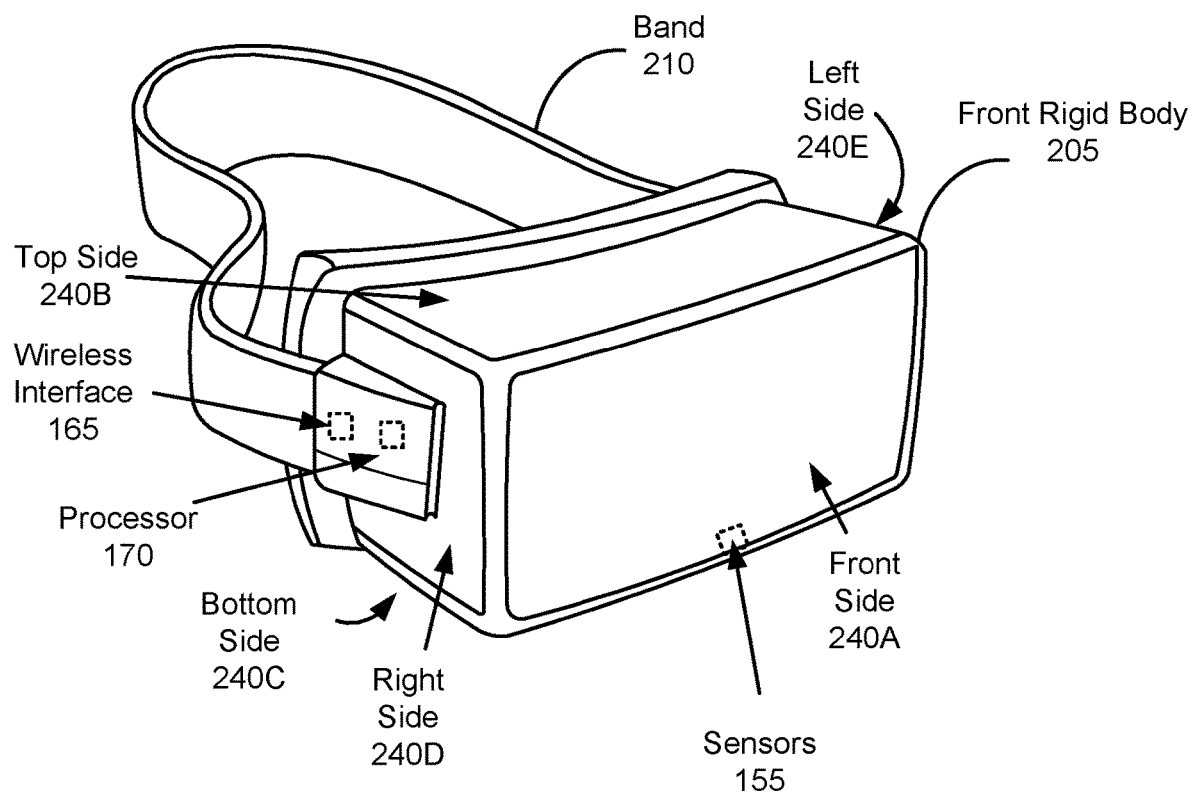
FIG. 2 is a diagram of a head mounted display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2. In some embodiments, the HWD 150 may include a plurality of communications interfaces 165. Similarly, the console 110 of FIG. 1 may include a plurality of communications interfaces 115. As described in greater detail below in section B, the communications interface(s) 115, 165 may be configured to selectively perform beamforming to optimize the communications channel between the console 110 and HWD 150. Similarly, the console 110 and HWD 150 may dynamically and intelligently switch between active and idle communications interface(s) 115, 165 to optimize the communications channel between the console 110 and HWD 150.

B. Computing System

Figure 3:
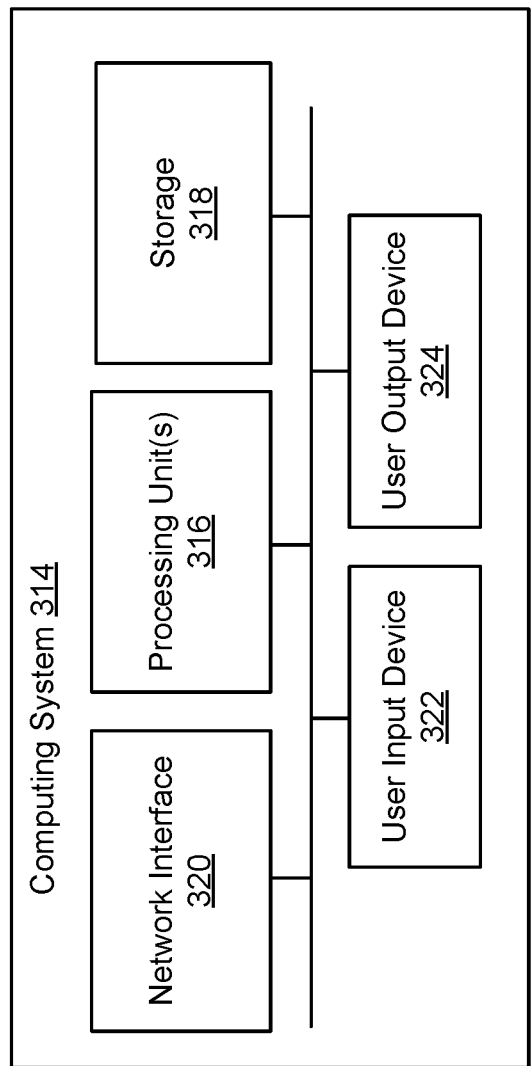
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 314 can be implemented to provide VR, AR, or MR experiences. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse, or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, (e.g., a liquid crystal display (LCD)), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations (e.g., by programming a processor or providing appropriate control circuitry) and various blocks might or might not be reconfigurable depending on how the initial configuration is obtained. Implementations of the present disclosure can be realized in a variety of apparatuses including electronic devices implemented using any combination of circuitry and software.

C. Systems and Methods for Peak Power Control

Figure 4:
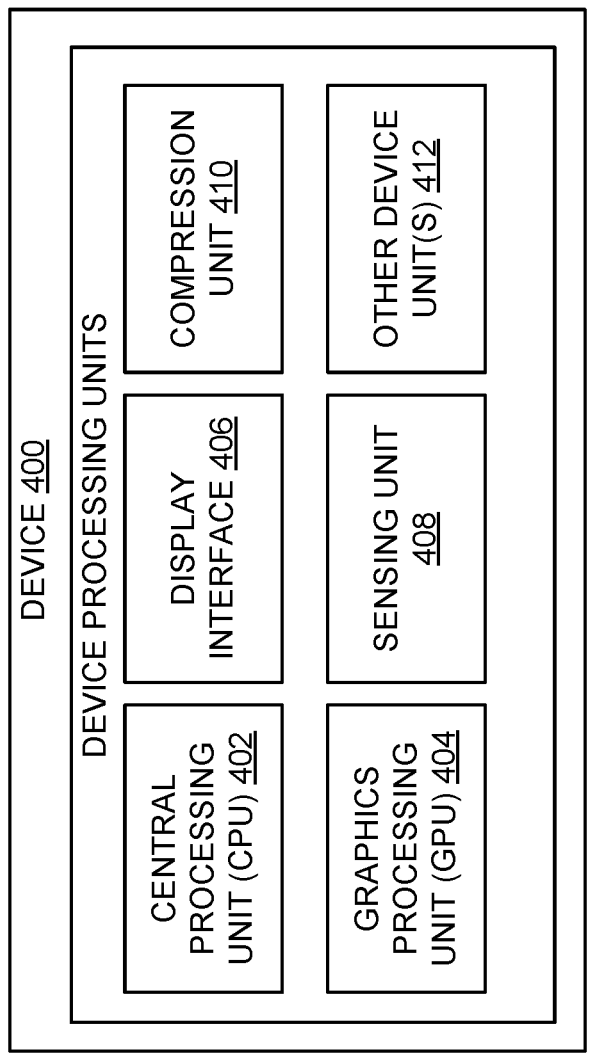
FIG. 4 is a block diagram of a device, according to an example implementation of the present disclosure.

Referring now to FIG. 4, depicted is a device 400, according to an example implementation of the present disclosure. The device 400 is shown to include various device units (e.g., processing/functional units/blocks/components), including a central processing unit (CPU) 402, a graphics processing unit (GPU) 404, a display interface 406, a sensing unit 408, a compression unit 410, and various other units 412, such as a camera unit, an I/O unit, decoders/ encoders, and/or other processing units of the device. In use, each of the device units may consume power at various rates and amounts. When designing a device, device performance metrics are often designed based on power consumption and delivery to increase overall performance, while ensuring that battery life and thermal qualities are optimized. The power supply at the transistor level is regulated to ensure robust voltage levels with minimal noise. Some devices may include a power distribution network (PDN) which can include, for instance, on-die decoupling capacitance, package decoupling capacitance, board power and ground planes, ceramic capacitors, bulk capacitors, and/or a voltage regulator module. The interaction between the PDN components may at times lead to non-ideal voltage during current sink (e.g., increased current draw due to co-operating of device units). Some devices 400 may maintain peak power limits to ensure that the device 400 can operate efficiently and optimally (e.g., without current sink).

Figure 5:
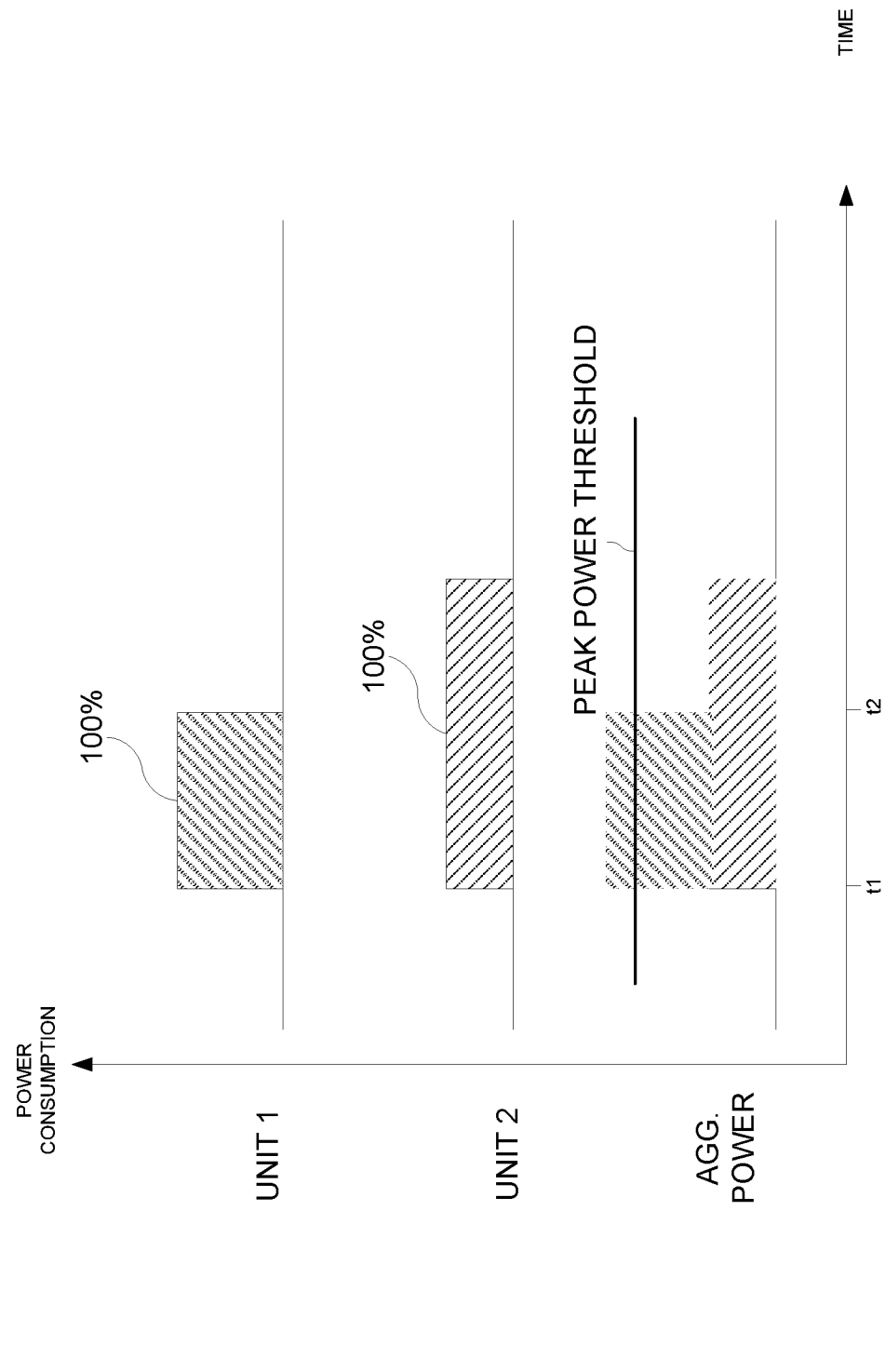
FIG. 5 is an example of a graph showing power consumption of two units (e.g., processing units) over time, according to an example implementation of the present disclosure.

Referring to FIG. 5, depicted is an example of a graph 500 showing power consumption of two units over time. At various times during operation or use of a device (such as device 400), some units may operate at the same or overlapping times. As shown in the graph 500, two units (e.g., UNIT 1 and UNIT 2) may operate at various times, including a range of time during which both units are operating. While operating, the units may draw, use, or otherwise consume full power. As a result of both units operating at substantially the same time (e.g., between t1 and t2), the total (or aggregate power) consumed by the units may exceed a peak power limit or threshold. When the total aggregate power consumed by units of a device (such as the units 402-412 shown in FIG. 4) exceed the peak power threshold, the device may have degraded performance. For instance, the units operating on the device and drawing power may experience current sink or voltage drop, the device may have increased thermal output, and so forth.

Most systems and devices are designed or configured to manage peak power based on a worst case scenario (e.g., where each of the units are executing concurrently at maximum power usage). While this worst case scenario may happen from time-to-time, overdesigning a device for this scenario is impractical and can be costly. As such, it may be beneficial to manage peak power on a unit-by-unit basis so that the overall peak power can be managed for the device. The systems and methods described herein may manage peak power by performing or implementing power credit management, hierarchical management, and/or allocation of power based on some type of quality of service (QoS). The systems and methods described herein may provide a relatively more steady-state power consumption, which may increase overall device efficiency.

According to the systems and methods described herein, a device may maintain one or more models for a plurality of processing units (such as those shown in FIG. 4) of the device. The device may identify a condition of the device and apply the condition to the model(s) to determine performance characteristics for the plurality of processing units. The device may distribute power credits to the plurality of processing units according to the determined performance characteristics for the plurality of processing units. Such implementations and embodiments may manage a respective peak power for the respective processing units according to the number of power credits distributed to the respective processing units. As such, the overall peak power (or aggregate peak power) for the device may not exceed the peak power threshold at any given time, which results in overall better performance at the processing unit level and ensuring overall peak power is managed efficiently.

Figure 6:
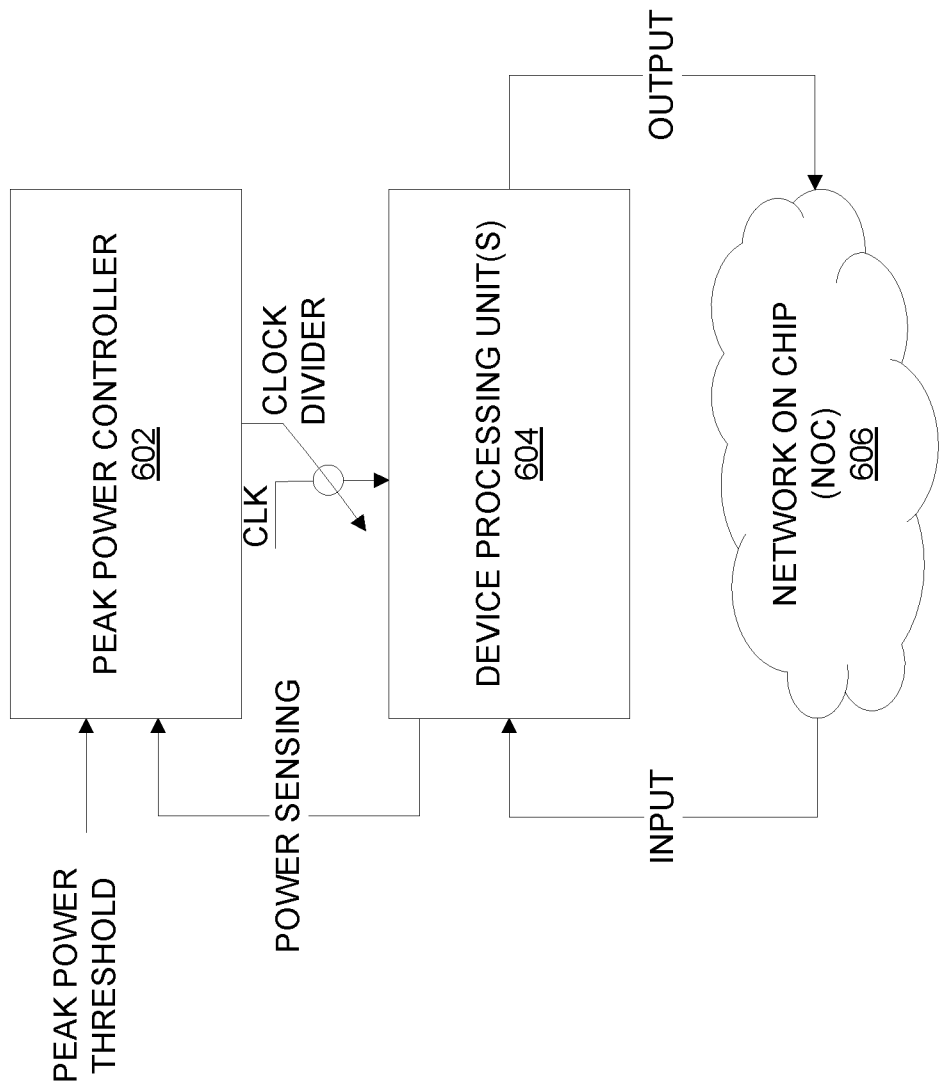
FIG. 6 is a block diagram of a system for managing peak power of one or more units on a device, according to an example implementation of the present disclosure

Referring now to FIG. 6, depicted is a system 600 for managing peak power of one or more units on a device, according to an example implementation of the present disclosure. The system 600 may be used by one or more of the devices described above with reference to FIG. 1-FIG. 4, such as the computing device 110 shown in FIG. 1, the HWD 150 shown in FIG. 1 and FIG. 2, the computing system 314 shown in FIG. 3, and/or the device 400 shown in FIG. 4. The system 600 is shown to include a peak power controller 602, one or more device processing units 604, and a network on a chip (NoC) 606. The peak power controller 602 may be or include one or more processors (or processing units 316), hardware, or other control circuitries configured using instructions stored in storage 318 to manage peak power for the device units 604 to which the peak power controller 602 is communicably coupled, manages, or otherwise controls. The device processing units 604 (sometimes referred to as device units 604, processing units 604, or units 604) may be or include any of the units described above with reference to FIG. 4 (e.g., CPU 402, GPU 404, display interface 406, sensing unit 408, compression unit 410, and/or other units 412). The device processing units 604 may be configured to communicate with other device units 604 via the NoC 606. The NoC 606 may be or include a serial bus, a communications link, a custom bus, or other channel/interface/links (such as PCIe, I2C, etc.) through which device units 604 may exchange, transmit, or receive data/signals/inputs/outputs/etc. with other device units 604.

Figure 7:
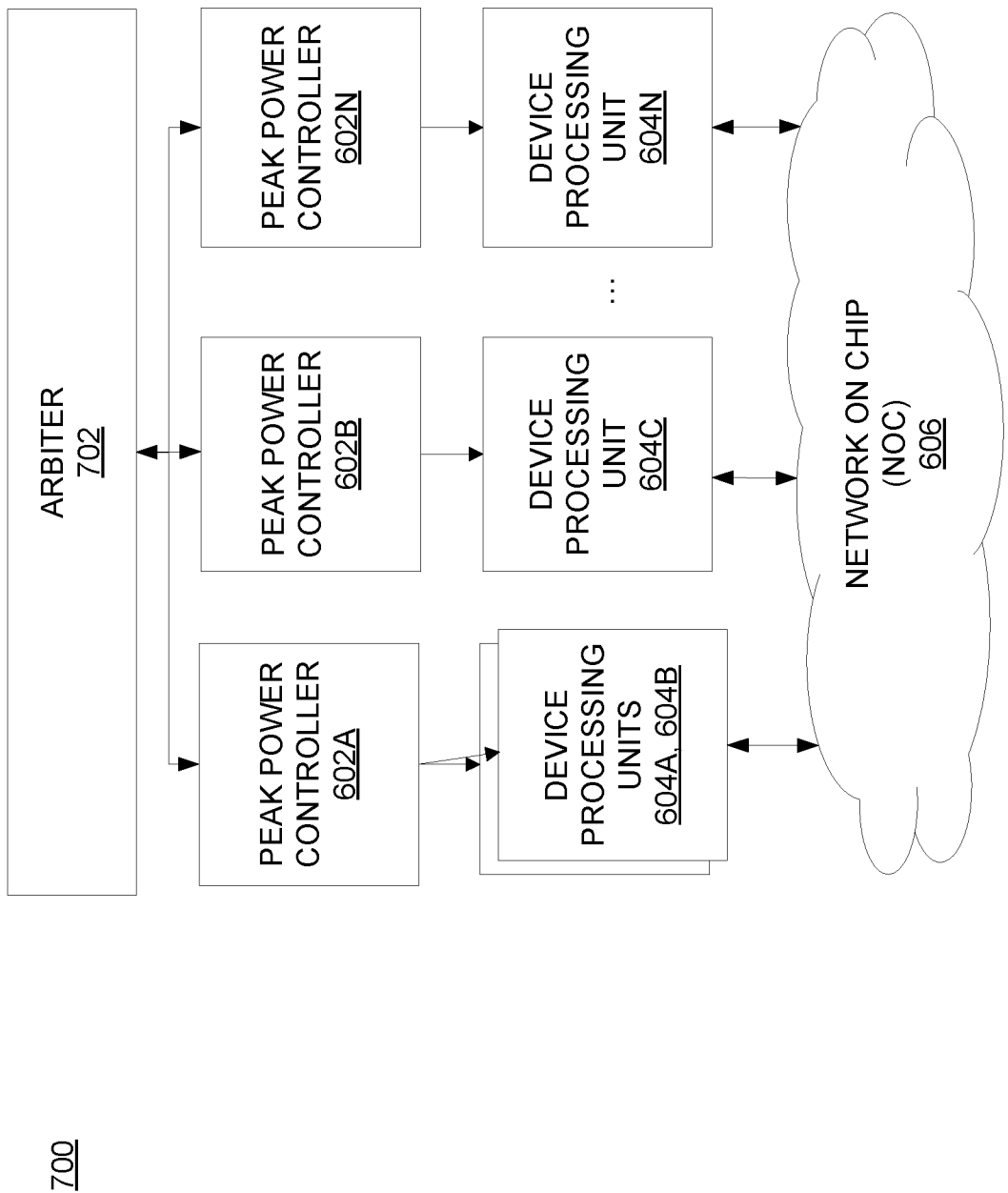
FIG. 7 is a block diagram of a system for managing peak power for a plurality of units on a device, according to an example implementation of the present disclosure.

Referring now to FIG. 7, depicted is a system 700 for managing peak power for a plurality of units on a device, according to an example implementation of the present disclosure. The system 700 is shown to include an arbiter 702 communicably coupled to a plurality of peak power controllers 602. In some instances, an arbiter 702 may be implemented by one or more processors of the device. The arbiter 702 may be separate from other units 604 of the device. For example, the arbiter 702 may be communicably coupled to (e.g., through corresponding peak power controllers 602) to a CPU 402 of the device, a GPU 404, and other units of the device. In some embodiments, the system 700 may include a plurality of arbiters 702 communicably coupled to different peak power controllers 602. In other words, the system 700 may include different numbers or levels of hierarchical control and feedback including any number of arbiters 702 and peak power controllers 602. The arbiter 702 may be configured to manage peak power across the different device processing units 604 of the device. Each of the processing units 604 may include or otherwise be communicably coupled to a respective peak power controller 602. As shown in FIG. 7, and in some embodiments, one peak power controller 602A may manage or be communicably coupled to a plurality of device processing units 604A, 604B, while other peak power controllers 602B, 602C may manage or be communicably coupled to dedicated (or single) respective device processing units 604C, 604N.

Each of the device processing units 604 may be managed or communicably coupled to a respective peak power controller 602. As described in greater detail below, the arbiter 702 may be configured to manage peak power across the processing units 604 of the device by allocating power credits to the peak power controller 602 for the respective units. The peak power controller 602 may be configured to throttle, control, schedule, or otherwise manage the power consumption of the respective unit based on the power credits allocated to the unit by the arbiter 702. As such, the power credits may generally indicate or correspond to a manner, degree, or amount in which the peak power controller 602 is to manage power consumption. For example, as the number of power credits increases, the peak power controller 602 may permit the corresponding unit(s) to use or consume more power. On the other hand, as the number of power credits decrease, the peak power controller 602 may throttle power consumption for the units.

Figure 8:
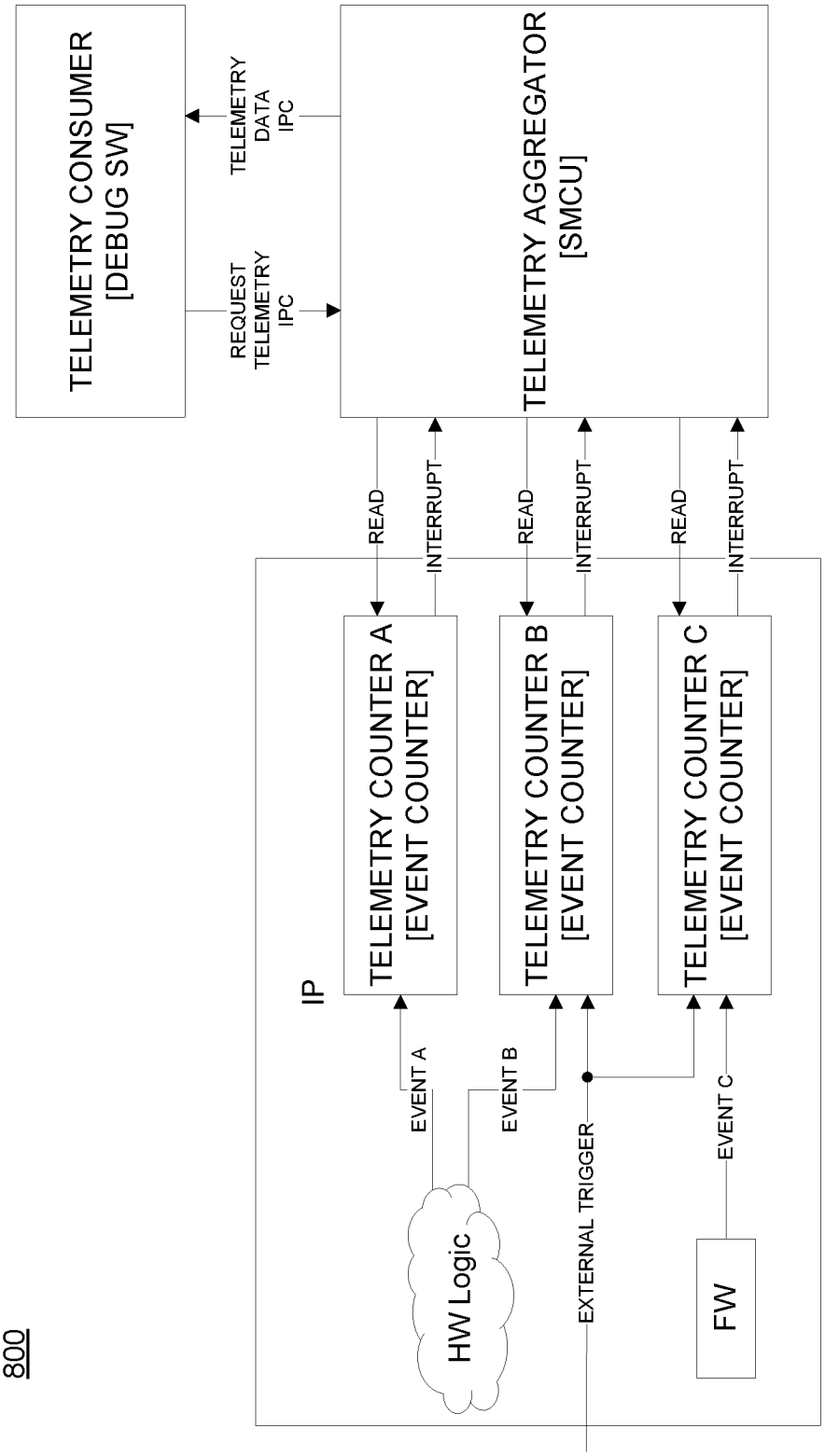
FIG. 8 is a block diagram of a system for identifying or predicting a condition of a device, according to an example implementation of the present disclosure.

Referring now to FIG. 8, the arbiter 702 may be configured to determine, detect, or otherwise identify a condition for the device. Specifically, FIG. 8 shows a system 800 for identifying or predicting a condition of the device, according to an example implementation of the present disclosure. The arbiter 702 may be configured to identify the condition for the device based on power demands on a per-unit basis. The condition for the device may be or include power demands across units of the device as compared to the peak power threshold. For example, the condition for the device may be or include an overhead of power based on current or expected power demands (e.g., power demands) across the units in comparison to the peak power threshold (e.g., a difference between the peak power threshold and total aggregate power demands from the units).

In some embodiments, the arbiter 702 may be configured to characterize, determine, or otherwise identify power profiles for each of the units 604 of the device, including hardware, firmware, and dynamic signal processing (DSP) components and/or workloads. The arbiter 702 may be configured to identify, determine, or otherwise generate power profiles for the units 604 by identifying each of the events triggering processing or computations for the units, including events triggered by hardware logic, external events or triggers, and/or firmware triggered events. The arbiter 702 may be configured to maintain a counter for each of the units 604, where the counter increases responsive to a new event being detected or otherwise identified by the arbiter 702. The arbiter 702 may be configured to determine or identify a power profile for a unit as a binary power profile. The binary power profile may be or include a binary indication of times or instances in which power is consumed or not consumed by a respective unit (e.g., power on or power off).

In some embodiments, the arbiter 702 may be configured to determine or identify a power profile for a unit based on or as a function of a code execution segment or particular task performed. For instance, some events or triggers may cause a unit 604 to consume or use more power than other events. The arbiter 702 may be configured to compute, calculate, or otherwise determine a power used by a particular unit as a function of energy and sample time (e.g., $$Power = \left(\frac{Energy}{Sample\ Time}\right).$$

The arbiter 702 may be configured to compute, calculate, or otherwise determine energy as a function of a sum of efficiency multiplied by an energy multiplier dynamic (EMD) and leakage multiplied by an energy multiplier leakage (EML) (e.g., Energy=$C_{eff}$×EMD+Leakage$_{base}$×EML). The arbiter 702 may be configured to compute, calculate, or otherwise determine the efficiency as a sum of the total number of events multiplied by a corresponding weight (e.g., $$C_{eff} = \sum_{n=0}^{k}(E_n \times W_n),$$

where E is an event and W is the corresponding weight). The arbiter 702 may be configured to compute, calculate, or otherwise determine the EMD as a function of a target voltage and nominal voltage (e.g., $$EMD = \left(\frac{V_{target}}{V_{nom}}\right)^2\right).$$

Similarly, the arbiter 702 may be configured to compute, calculate, or otherwise determine the EMD as a function of a target voltage and nominal voltage multiplied by a time scalar (e.g., $$EML = \left(\left(\frac{V_{target}}{V_{nom}}\right)^2 \times scalar(T_j)\right).$$

The arbiter 702 may be configured to generate, determine, or otherwise identify power profiles for each of the unit 604 based on the determined power (e.g., binary power consumed or power consumed based on a code execution segment or particular task performed). For example, the power profiles for each unit may include data which represents an average number of tasks performed over a time duration, an amount of power consumed for each task, an interval in which the tasks are performed, etc. As such, the power profiles may indicate or otherwise represent predicted power consumption for a respective unit over time. The arbiter 702 may be configured to use the power profiles for determining the condition of the device by predicting likely power consumption across the units for a given time.

In some embodiments, the arbiter 702 may be configured to maintain one or more models for the units. Similar to power profiles, which reflect a likely power consumption, the one or more models may indicate performance characteristics of the units while consuming power. For example, the models may indicate, including data corresponding to, or otherwise identify a computational duration or execution time and/or a time in which tasks are to be completed by (or real-time deadline). The arbiter 702 may be configured to generate the models for the units in a manner similar to generating the power profiles (e.g., by tracking events and triggers, monitoring duration in which the units perform computations or processing for a given event or trigger, and determining or identifying any deadlines assigned by the unit from the start of receiving/detecting the event or start of processing the event). The arbiter 702 may be configured to collect, compile, or otherwise use the execution time and real-time deadlines for prior tasks to generate the models for the units 604.

The arbiter 702 may be configured to apply the condition of the device to models to determine performance characteristics for the units. In some embodiments, the arbiter 702 may be configured to identify a slack for the units 604 of the device. Slack may be or include how much a respective unit may delay execution of a particular task without effecting QoS. In other words, the slack for a particular unit 604 may be or include the available execution margin (e.g., from a current time instance) for the unit to meet a real-time deadline. The real-time deadline may be or include a deadline which is defined by device specifications (such as a frame refresh rate, for example). As such, the real-time deadline may be a time in which processing or computations by a particular unit 604 is to be complete. The arbiter 702 may be configured to identify slack for each of the units 604 accompanied by an execution time for the respective unit. The execution time may be or include a duration in which a particular unit 604 performs computation or processing from start to completion.

In some embodiments, the models may be configured to predict what the power consumption is going to be for a particular workload that is going to be known when the unit begins to operate. Additionally, the models may be configured to predict how long particular processes or computations can take given prior inputs or triggers or events. For example, the models may be configured to predict how many flops per pixel a unit will use to process an image. The arbiter 702 may be configured to apply the model to a given image with a number of pixels as an input to determine (at a reasonably close threshold) how long it can take for a GPU to process the image. Since each unit 604 may be designed or configured to have a particular processing throughput, the models may be configured to provide a prediction on how long it can take (e.g., execution time) and how much power a unit may consume to complete a given task. Additionally, the models may be tuned, trained, or otherwise configured to receive inputs relating to a given task (such as resolution and/or frames per second for a video decoder or GPU, for example). The models may be configured to output the prediction based on the inputs for the given task.

The arbiter 702 may be configured to distribute power credits to the units (e.g., through the peak power controller) based on the performance characteristics for the units. For example, if the slack time and the execution time are able to satisfy the run-time deadlines, the arbiter 702 may schedule execution such that each of the units 604 satisfy their respective run-time deadlines and delay execution of at least some of the units 604 such that each of the units 604 aggregately (or collectively) satisfy the power cap or peak power threshold for the device. Similarly, the arbiter 702 may schedule execution of units 604 which have a longer execution time or earlier respective real-time deadline earlier, so that the QoS of the device is not compromised.

Figure 9:
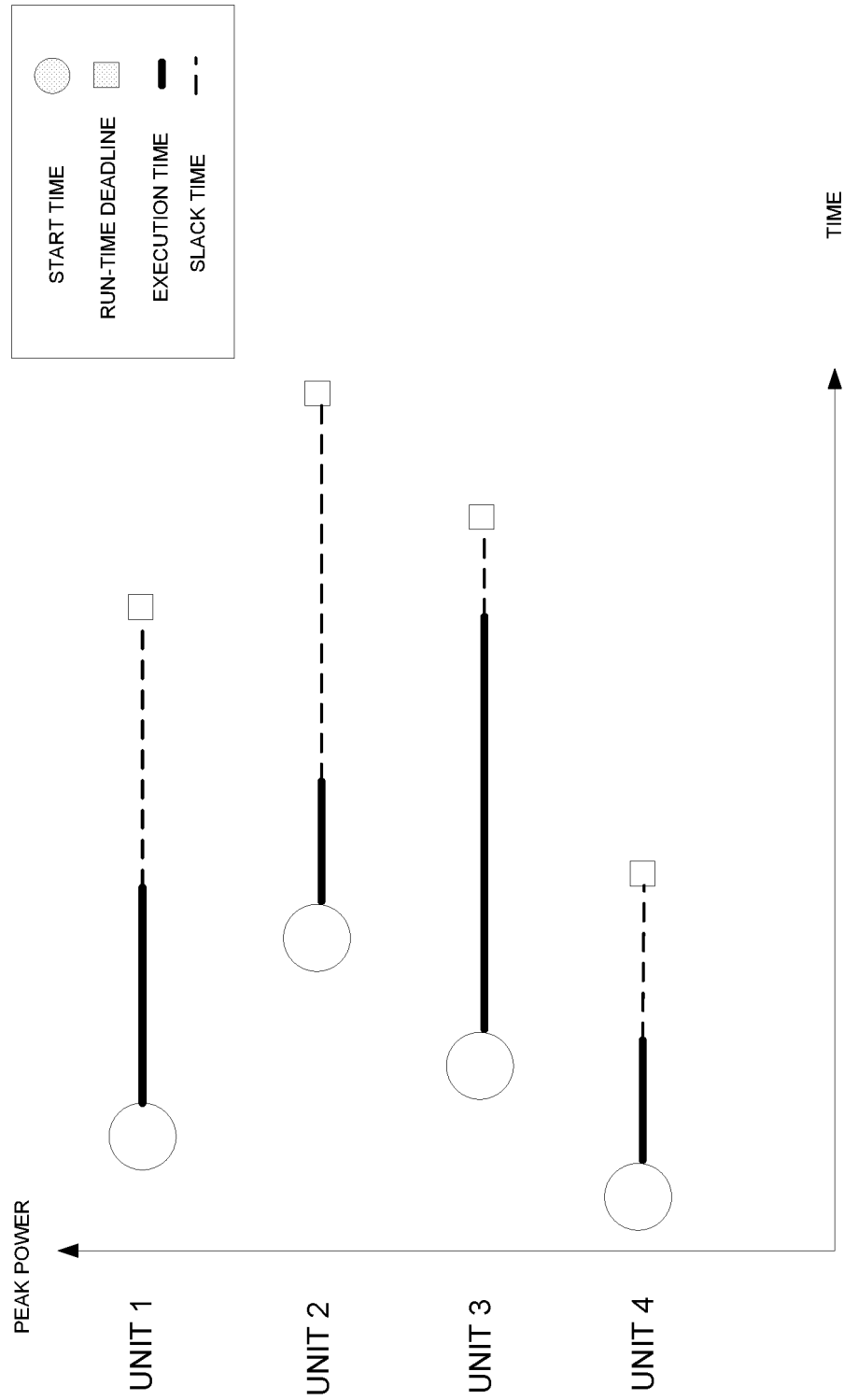
FIG. 9 is an example unit schedule for units of a device, according to an example implementation of the present disclosure.

Referring now to FIG. 9, depicted is an example unit schedule 900 generated by the arbiter 702, according to an example implementation of the present disclosure. The arbiter 702 may be configured to schedule start times for units 604 of the device according to the determined slack time and execution time in relation to the run-time deadlines for each of the units. In some embodiments, the arbiter 702 may be configured to determine an order of the units 604 in which to adjust or modify power consumption for the units. In some embodiments, the arbiter 702 may be configured to perform a uniform reduction or delay of unit execution start time until the units 604 can satisfy their respective run-time deadline (e.g., according to reduction =

$$PeakPower(i) \times \frac{SlackTime(i)}{ExecutionTime(i) + SlackTime(i)}.$$

In some embodiments, the arbiter 702 may be configured to perform a maximum short term power reduction lasting up to slack time for a unit (e.g., delay unit execution of a unit which has the greatest slack time). In some embodiments, the arbiter 702 may be configured to perform a total power reduction over time for the units (e.g., according to reduction=PeakPower(i)×SlackTime(i)). In some embodiments, the arbiter 702 may be configured to sort units for power reduction or delayed execution based on absolute slack time, impact on system overall performance or balancing system load, based on impact to user experience or graceful performance degradation, or a weighted combination of various combinations of these and other criteria. For example, the arbiter 702 may be configured to reduce power or delay execution of units sorted by their overall power reduction potential starting from the top ranked unit (e.g., unit having greatest slack time, latest run-time deadline, shortest execution time, least impact on system performance or user experience, etc.) until the maximum predicted power for the aggregated unit is less than or equal to the peak power threshold. As shown in FIG. 9, the start times for the units may be staggered such that each of the units satisfy their respective run-time deadline while distributing power consumption across the units to avoid the total power consumption exceeding the peak power threshold for the device.

Figure 10:
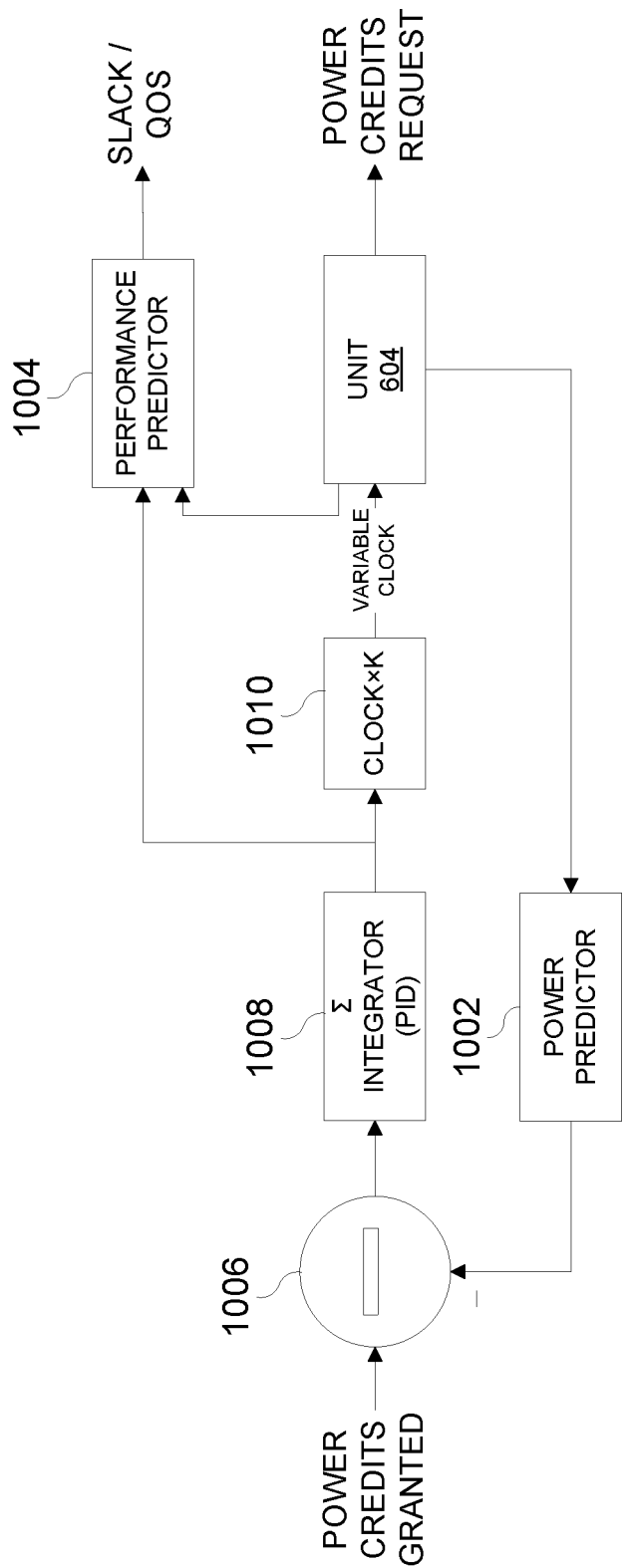
FIG. 10 is a block diagram of a system for predicting performance and power for a unit, according to an example implementation of the present disclosure.

Referring now to FIG. 10, depicted is an example system 1000 for predicting performance and power for a unit, according to an illustrative embodiment. The system 1000 may be used by the peak power controllers 602 to allocate credits to the units 604. As shown in FIG. 10, the system 1000 is shown to include a power predictor 1002, a performance predictor 1004, a comparator 1006, an integrator 1008, and a clock 1010. The peak power controllers 602 may be configured to implement the system 1000 to predict power demands for each of the units 604 (e.g., using the power profile and/or models for the unit 604 generated or otherwise maintained by the arbiter 702). For example, the peak power controllers 602 may be configured to implement a power predictor 1002 which predicts power demands for the unit 604 using the power profile for the corresponding unit 604. The peak power controllers 602 may be configured to request power credits from the arbiter 702 based on the predicted power demands for the unit (e.g., request more power credits where more power is needed, push credits back to the arbiter where less power is needed, etc. In some embodiments, the peak power controllers 602 may be configured to implement a performance predictor 1004 which determines or predicts performance characteristics for the unit 604 based on a particular unit. For example, the performance predictor may receive an input/trigger/event which is to be processed by the unit 604 and can determine a slack for the unit (e.g., by applying the input/trigger/event to the model trained for the unit), which may be output to the arbiter 702 along with the number of requested power credits. The peak power controllers 602 may be configured to compare (e.g., via the comparator 1006) the requested number of power credits to the granted number of power credits from the arbiter 702. The integrator 1008 may be configured to generate a clock multiplier (K) based on the number of granted power credits or the comparison, to reduce the power consumption by the unit 604 according to the granted power credits.

The peak power controller 602 may be configured to implement a control algorithm for controlling how power is allocated or managed for a respective unit 604 (e.g., hardware or processing unit) for a given device. The peak power controller 602 may be configured to degrade unit performance responsive to receiving less power credits than requested from the arbiter 702. For example, the peak power controller 602 may be configured to implement or include a fractional clock divider (which may be considered a "knob" for throttling or otherwise controlling power). The peak power controller 602 may control the power for a particular unit based on a number of power credits that are being allocated to the particular unit by the arbiter 702. As another example, the peak power controller 602 may be configured to optimize the amount of power consumed by the units 604 during execution to provide dynamic power management with aggregate power less than a predetermined threshold (or peak power/power cap). The peak power controller 602 may be configured to optimize the amount of power consumed by applying a different clock signal (e.g., a clock multiplier, K, to a global clock signal for the device), a different pulse width, or otherwise slow down a particular unit 604, which decreases power consumption but may also delay execution.

Figure 11A:
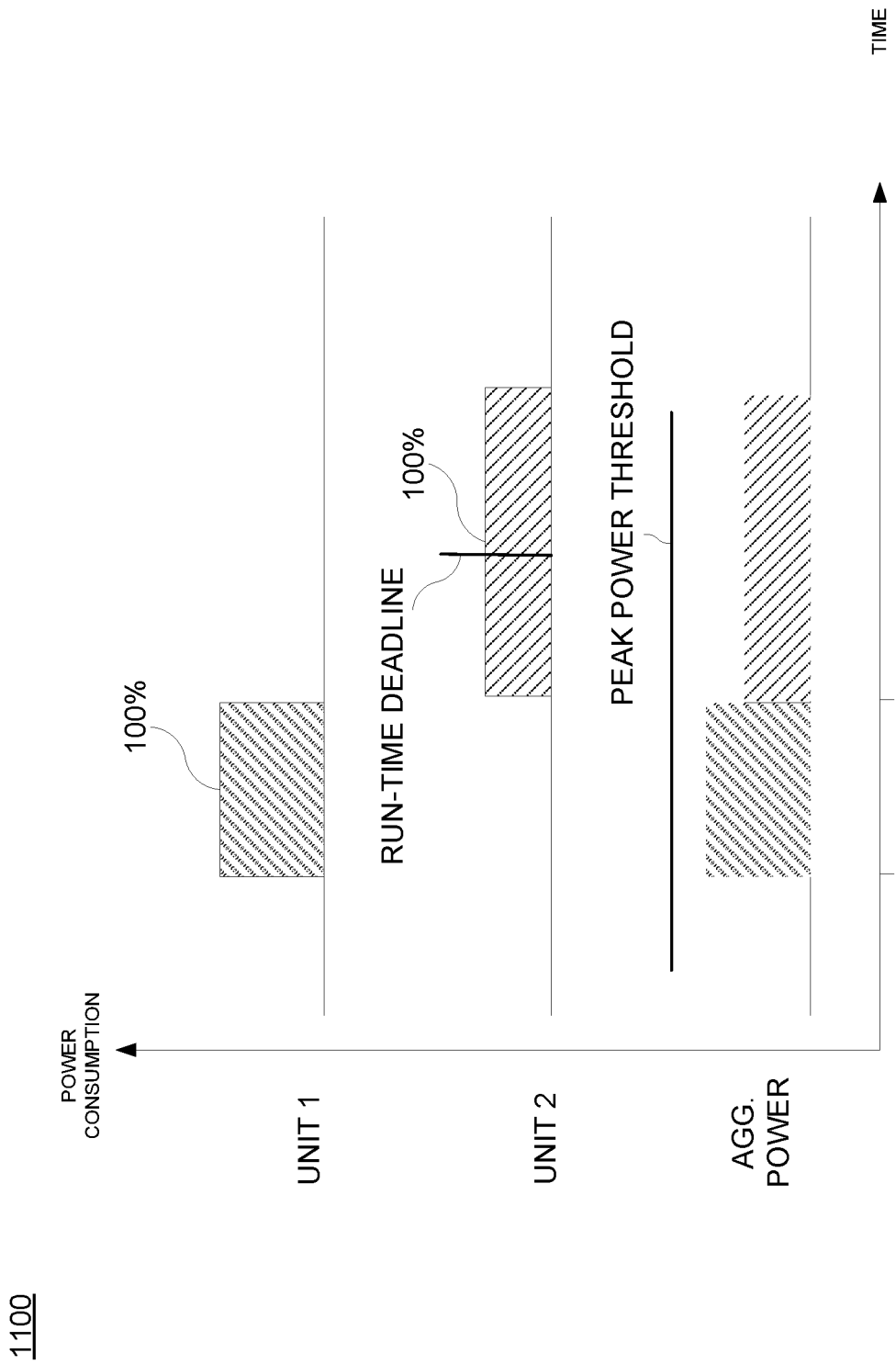
FIG. 11A and FIG. 11B show examples of graphs showing power consumption of two units over time, according to example implementations of the present disclosure.
Figure 11B:
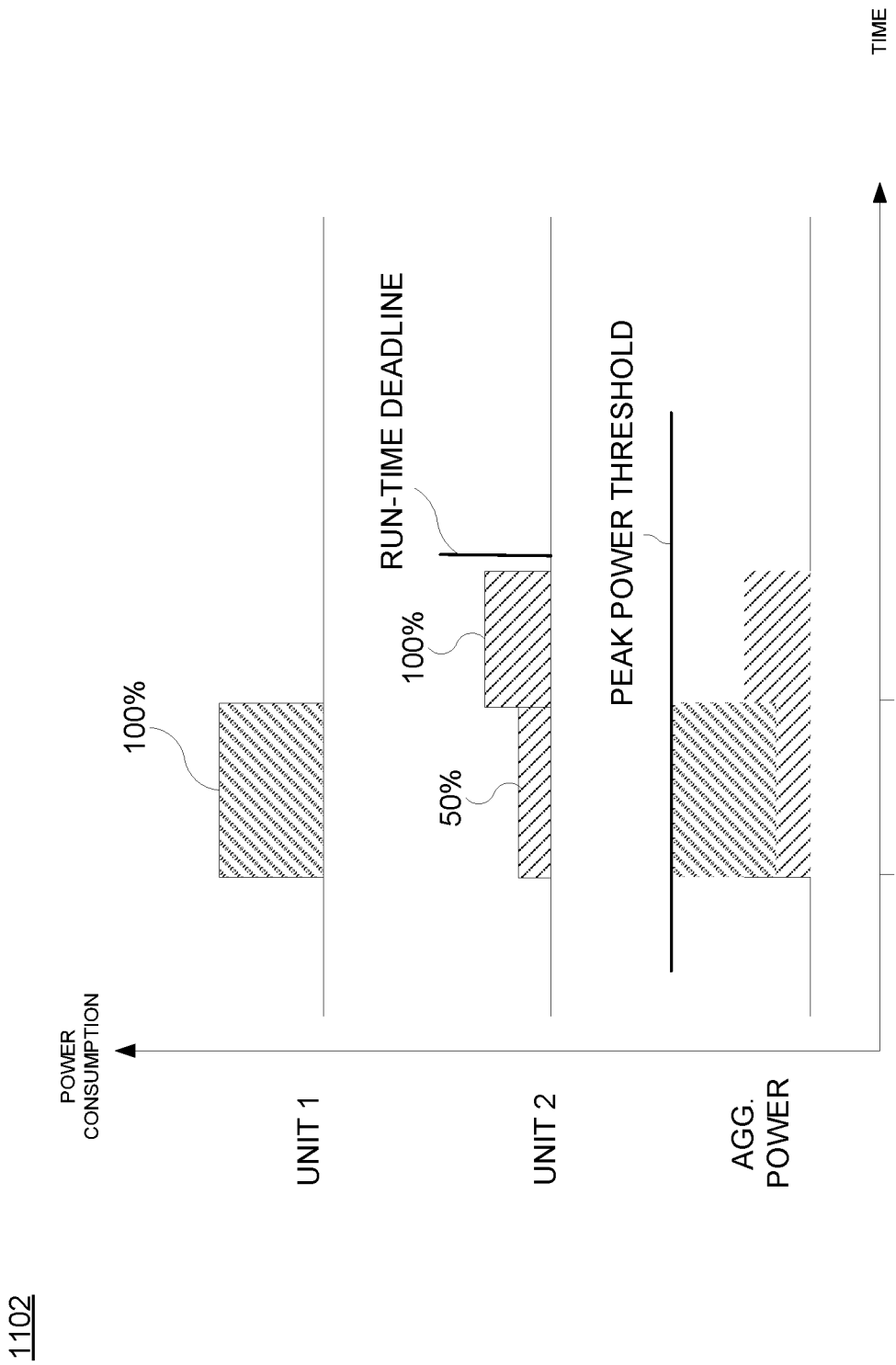

Referring now to FIG. 11A and FIG. 11B, depicted are examples of a graph 1100, 1102 showing power consumption of two units over time using the systems and methods described herein, according to example implementations of the present disclosure. FIG. 11A and FIG. 11B are similar in some aspects to FIG. 5 described above. As shown in FIG. 11A, in some instances, the arbiter 702 may delay execution of a particular unit to ensure that the aggregate power is less than the peak power threshold. For example, the arbiter 702 may delay execution of unit 2 so that the aggregate power of unit 1 and unit 2 between t1 and t2 is less than the peak power threshold. However, by delaying execution of unit 2, the unit may have negative slack time (or completion of the process may be after the run-time deadline). In this example, QoS for unit 2 may be compromised. As shown in FIG. 11B, in some embodiments, the arbiter 702 may decrease power credits allocated to unit 2 (resulting in decreased power consumption of unit 2) while unit 1 is executing (e.g., between t1 and t2). After t2, the arbiter 702 may allocate power credits from unit 1 to unit 2 such that unit 2 can execute at full power and still satisfy the run-time deadline.

Figure 12:
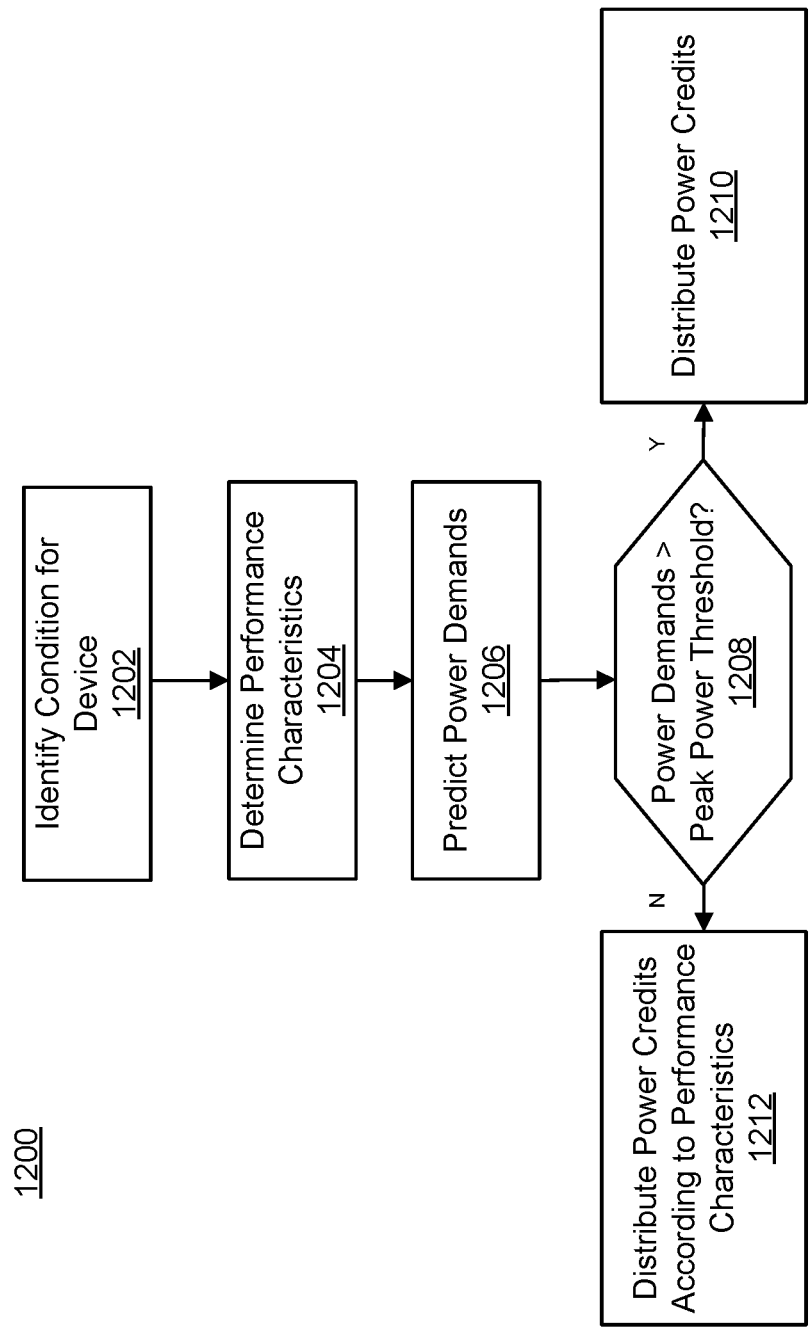
FIG. 12 is a flowchart showing a method of peak power control, according to an example implementation of the present disclosure.

Referring now to FIG. 12, depicted is a flowchart showing a method 1200 of peak power control, according to an example implementation of the present disclosure. The method 1200 may be performed by one or more of the components described above with reference to FIG. 1-FIG. 10 (such as the arbiter 702, the peak power controllers 602, etc.). As a brief overview, at step 1202, control circuitry of the device (such as the arbiter 702, peak power controllers 602, etc.) can identify a condition for the device. At step 1204, the control circuitry may determine performance characteristics. At step 1206, the control circuitry can predict power demands. At step 1208, the control circuitry can determine whether the power demands exceed the peak power threshold. At step 1210, the control circuitry can distribute power credits. At step 1212, the control circuitry can distribute power credits according to the performance characteristics.

At step 1202, control circuitry of the device can identify a condition for the device. The control circuitry may include one or more processors or processing components/elements of the device which perform instructions programmed or stored in memory of the device. The control circuitry may implement the arbiter 702, peak power controller 602, etc., by executing corresponding instructions from memory. In some embodiments, the control circuitry may identify the condition responsive to detecting a new event or trigger which is to cause one or more device processing units (such as the GPU, CPU, and/or other units of the device) to perform one or more tasks. In some embodiments, the control circuitry may apply the new event or trigger to one or more processing profiles maintained for the processing units to identify the condition of the device. The condition may include, for instance, a power demand across the processing units, an expected or predicted power demand across the processing units, and so on.

At step 1204, the control circuitry can determine performance characteristics. The control circuitry may determine performance characteristics for a plurality of processing units of the device (such as the GPU, CPU, and/or other units of the device). In some embodiments, the control circuitry may apply the condition (determined at step 1202) to one or more models maintained for a plurality of device processing units of the device to determine the performance characteristics for the plurality of processing units. The models may be trained, generated, established or otherwise maintained based on past performance of the processing units on similar data/events/triggers. Some inputs, events, or triggers may be iterative in nature (e.g., driven by refresh rates, periodic computations, etc.), while some inputs, events, or triggers may be on demand (e.g., a user providing a user input, accessing or downloading a resource, etc.). For example, a model for a GPU may be trained based on prior processing of graphics performed by the GPU. The model may indicate an average or estimated power demand or draw for a given input, an average or estimated processing execution time for a given graphics input, an average run-time deadline, etc. The control circuitry may apply an event or trigger to the models of the device to determine performance characteristics (such as power demand, run-time deadlines, execution times, etc.) for the processing units.

At step 1206, the control circuitry predicts power demands. In some embodiments, the control circuitry may determine, identify, compute, or otherwise predict the power demands based on the performance characteristics of the device processing units. For example, the control circuitry may predict the power demands for the device processing units by computing a sum of the average/expected/estimated/predicted power demand of the device processing units (from the performance characteristics) for a given input, trigger, or event.

At step 1208, the control circuitry can determine whether the power demands exceed the peak power threshold. The control circuitry may compare the predicted power demands (e.g., at step 1206) to a peak power threshold for the device. The peak power threshold may be a preset threshold set for the device. The peak power threshold may change based on various factors, such as current battery level of the device (e.g., to reduce the peak power threshold as the battery level reduces to conserve power, to increase the peak power threshold at full battery level to increase performance, etc.). Where the predicted power demands satisfy the peak power threshold (e.g., are less than or equal to the peak power threshold), the method 1200 may proceed to step 1210. On the other hand, where the predicted power demands are greater than or exceed the peak power threshold, the method 1200 may proceed to step 1212.

At step 1210, the control circuitry distributes power credits. The control circuitry may distribute credits to each of the device processing circuits which are to perform processing for a given event/trigger/input. In some embodiments, the device processing may request credits from the control circuitry. For example, the device processing units (e.g., the peak power controller for the device processing units) may request credits based on their estimated performance characteristics to perform computations or processing for a respective input/trigger/event. The device processing units may transmit the request (including the number of requested power credits) to the control circuitry. The control circuitry may determine an available number of power credits for the device. In some instances, where power credits have already been granted to some device processing units by the control circuitry, the control circuitry may determine whether there are any available power credits (e.g., that does not result in aggregate power consumed by the units exceeding the peak power threshold). The control circuitry may allocate additional credits to other device processing units. In other words, the control circuitry may selectively allocate additional power credits to requesting device processing units so long as the total number of allocated power credits does not result in the power consumed by the units exceeding the peak power threshold.

At step 1212, if the predicted power demands exceed the peak power threshold, the control circuitry can distribute power credits according to the performance characteristics. In some embodiments, the control circuitry distributes power credits according to the performance characteristics for the plurality of device processing units. The control circuitry may distribute the power credits to manage a respective peak power for each respective device processing unit according to a number of the power credits distributed to the respective device processing unit. In some embodiments, the control circuitry distributes power credits to device processing units according to a likely impact to a quality of service (QoS). For instance, the control circuitry may determine a QoS level for the respective device processing units, which may include a maximum allowable latency, a minimum throughput, etc. The control circuitry may prioritize allocating power credits to device processing units which can have a minimum impact (e.g., resulting in the greatest overall) QoS. In other words, the control circuitry may grant the number of requested power credits to device processing units which would otherwise have an impact on QoS if the device processing units did not have the requested number of power credits, while granting fewer than the number of requested power credits to device processing units which would have a lesser impact on QoS.

As one example, and in some embodiments, the control circuitry may receive a request for additional power credits from a first device processing unit (such as a CPU) of the plurality of device processing units. The control circuitry may determine a quality of service (QoS) level for the first device processing unit and a QoS level for a second device processing unit (such as a sensing unit) according to the one or more models (e.g., for the first device processing unit and the second device processing unit). The control circuitry may recall at least one power credit from the second device processing unit, and allocate the power credit to the first device processing unit. The control circuitry may recall power credits from the second device processing unit (e.g., the sensing unit in this example) and allocate those power credits to the first processing unit (e.g., the CPU) based on the QoS level for the CPU having a greater impact on device QoS than the QoS level for the sensing unit.

The processing units may degrade performance characteristics when they receive less than the requested number of power credits (or having power credits recalled from the processing units). In some embodiments, the processing units may degrade the performance characteristics by degrading a calculation rate, degrading a calculation accuracy, avoiding performing at least one processing step, reducing an operating voltage, or reducing an operating frequency. In some embodiments, the control circuitry may manage the respective peak power by managing a data throughput according to the number of the power credits distributed to the respective device processing unit. For example, the control circuitry may cause at least some of the device processing unit to have a lower data throughput (e.g., by reducing the number of power credits, which may cause the device processing units to operate at a lower frequency or clock speed/rate). In some embodiments, the control circuitry may manage the respective peak power by delaying execution of one or more processes according to the number of the power credits distributed to the respective device processing unit. For example, the control circuitry may schedule execution by one or more of the device processing units based on the number of power credits (e.g., to decrease slack for the processing unit while still satisfying run-time deadlines/requirements).

In some embodiments, the control circuitry may receive a request from a processing unit to recall a power credit allocated to the processing unit. For example, a device processing unit may transmit a request to recall a power credit where the device processing unit determines that the power credit is not needed to satisfy run-time deadlines, to properly perform computations, etc. In other words, a device processing unit may request to push back power credits to the control circuitry where the device processing unit determines that the power credits are not needed by the device processing unit. The control circuitry may recall the power credit from the processing unit. In some embodiments, the control circuitry may allocate that power credit to a different processing unit. For example, the control circuitry may allocate recalled power credits to other device processing units which previously requested additional power credits (but were granted less than the requested number of power credits).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general or special purpose computer or other machine with a processor. By way of example, such machine-readable media can comprise RAM, ROM, EPROM, EEPROM, or other optical disk storage, magnetic disk storage, or other magnetic storage devices, or any other medium which can be used to carry or store desired program code in the form of machine-executable instructions or data structures and which can be accessed by a general or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings, and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
identifying, by one or more control circuitries of a device, a condition for the device;
applying, by the one or more control circuitries, the condition for the device to one or more models maintained for a plurality of device processing units of the device to determine one or more performance characteristics for the plurality of device processing units, each device processing unit having a respective peak power which is a portion of an aggregate peak power of the device, the plurality of device processing units including a first device processing unit comprising one of a central processing unit (CPU), a graphics processing unit (GPU), a display interface, a sensing unit, a compression unit, a camera unit, an input/output (I/O) unit, a decoder, or an encoder, and a second device processing unit comprising a different one of the CPU, the GPU, the display interface, the sensing unit, the compression unit, the camera unit, the I/O unit, the decoder, or the encoder; and
distributing, by the one or more control circuitries, power credits to the plurality of device processing units of the device, including a first number of power credits to the first device processing unit and a second number of power credits to the second device processing unit, according to the determined performance characteristics for the plurality of device processing units, to manage the respective peak power for each respective device processing unit according to a number of the power credits distributed to the respective device processing unit, wherein
the one or more control circuitries distributes the power credits to the plurality of device processing units, according to an impact of quality of service (QoS) levels for a respective device processing unit to a device QoS for the device.

2. The method of claim 1, further comprising:
receiving, by the one or more control circuitries, a request for additional power credits from the first device processing unit;
determining, by the one or more control circuitries, an available number of power credits for the device; and
allocating, by the one or more control circuitries, at least one additional power credit for the first device processing unit according to the available number of power credits.

3. The method of claim 1, further comprising:
receiving, by the one or more control circuitries, a request for additional power credits from the first device processing unit;
determining, by the one or more control circuitries, according to the one or more models, a QoS level for the first device processing unit and a QoS level for the second device processing unit;
recalling, by the one or more control circuitries, at least one power credit from the second device processing unit; and
allocating, by the one or more control circuitries, the at least one power credit to the first device processing unit.

4. The method of claim 3, wherein the second device processing unit degrades at least one of the one or more performance characteristics for the second device processing unit responsive to the recalling of the at least one power credit.

5. The method of claim 4, wherein the second device processing unit at least one of: degrades a calculation rate, degrades a calculation accuracy, avoids performing at least one processing step, reduces an operating voltage, or reduces an operating frequency.

6. The method of claim 1, wherein the one or more control circuitries manage the respective peak power by managing a data throughput according to the number of the power credits distributed to the respective device processing unit.

7. The method of claim 1, wherein the one or more control circuitries manage the respective peak power by delaying execution of one or more processes according to the number of the power credits distributed to the respective device processing unit.

8. The method of claim 1, wherein the one or more performance characteristics comprise at least one of a predicted peak power consumption, a predicted execution completion deadline, or a predicted slack time.

9. The method of claim 1, further comprising:
receiving, by the one or more control circuitries, from the first device processing unit, a request to recall a power credit allocated to the first device processing unit;
recalling, by the one or more control circuitries, the power credit from the first device processing unit.

10. The method of claim 9, further comprising:
allocating, by the one or more control circuitries, the power credit recalled from the first device processing unit to the second device processing unit.

11. A device comprising:
a plurality of device processing units, the plurality of device processing units including a first device processing unit comprising one of a central processing unit (CPU), a graphics processing unit (GPU), a display interface, a sensing unit, a compression unit, a camera unit, an input/output (I/O) unit, a decoder, or an encoder, and a second device processing unit comprising a different one of the CPU, the GPU, the display interface, the sensing unit, the compression unit, the camera unit, the I/O unit, the decoder, or the encoder; and
one or more control circuitries configured to:
identify a condition for the device;
apply the condition for the device to one or more models maintained for the plurality of device processing units to determine one or more performance characteristics for the plurality of device processing units, each device processing unit having a respective peak power which is a portion of an aggregate peak power of the device; and
distribute power credits to the plurality of device processing units, including a first number of power credits to the first device processing unit and a second number of power credits to the second device processing unit, according to the determined performance characteristics for the plurality of device processing units, to manage the respective peak power for each respective device processing unit according to a number of the power credits distributed to the respective device processing unit, wherein
the one or more control circuitries distributes the power credits to the plurality of device processing units, according to an impact of quality of service (QoS)

levels for a respective device processing unit to a device QoS for the device.

12. The device of claim 11, wherein the one or more control circuitries are configured to:
receive a request for additional power credits from the first device processing unit;
determine an available number of power credits for the device; and
allocate at least one additional power credit for the first device processing unit according to the available number of power credits.

13. The device of claim 11, wherein the one or more control circuitries are configured to:
receive a request for additional power credits from the first device processing unit;
determine, according to the one or more models, a QoS level for the first device processing unit and a QoS level for the second device processing unit;
recall at least one power credit from the second device processing unit; and
allocate the at least one power credit to the device first processing unit.

14. The device of claim 13, wherein the second device processing unit degrades at least one of the one or more performance characteristics for the second device processing unit responsive to the recalling of the at least one power credit.

15. The device of claim 14, wherein the second device processing unit at least one of: degrades a calculation rate, degrades a calculation accuracy, avoids performing at least one processing step, reduces an operating voltage, or reduces an operating frequency.

16. The device of claim 11, wherein the one or more control circuitries manage the respective peak power by managing a data throughput according to the number of the power credits distributed to the respective device processing unit.

17. The device of claim 11, wherein the one or more control circuitries manage the respective peak power by delaying an execution of one or more processes according to the number of the power credits distributed to the respective device processing unit.

18. The device of claim 11, wherein the one or more performance characteristics comprise at least one of a predicted peak power consumption, a predicted execution completion deadline, or a predicted slack time.

19. The device of claim 11, wherein the one or more control circuitries are configured to:
receiving, by the one or more control circuitries, from the first device processing unit, a request to recall a power credit allocated to the first device processing unit;
recalling, by the one or more control circuitries, the power credit from the first device processing unit; and
allocating, by the one or more control circuitries, the power credit recalled from the first device processing unit to the second device processing unit.

20. A non-transitory computer readable medium storing instructions that, when executed by one or more control circuitries, cause the one or more control circuitries to:
identify a condition for a device;
apply the condition for the device to one or more models maintained for a plurality of device processing units of the device to determine one or more performance characteristics for the plurality of device processing units, each device processing unit having a respective peak power which is a portion of an aggregate peak power of the device, the plurality of device processing units including a first device processing unit comprising one of a central processing unit (CPU), a graphics processing unit (GPU), a display interface, a sensing unit, a compression unit, a camera unit, an input/output (I/O) unit, a decoder, or an encoder, and a second device processing unit comprising a different one of the CPU, the GPU, the display interface, the sensing unit, the compression unit, the camera unit, the I/O unit, the decoder, or the encoder; and
distribute power credits to the plurality of device processing units, including a first number of power credits to the first device processing unit and a second number of power credits to the second device processing unit, according to the determined performance characteristics for the plurality of device processing units, to manage the respective peak power for the respective device processing unit according to a number of the power credits distributed to the respective device processing unit, wherein
the one or more control circuitries distributes the power credits to the plurality of device processing units, according to an impact of quality of service (QoS) levels for a respective device processing unit to a device QoS for the device.

* * * * *